US012114245B2

(12) United States Patent
Makabe

(10) Patent No.: US 12,114,245 B2
(45) Date of Patent: Oct. 8, 2024

(54) WIRELESS COMMUNICATION APPARATUS, VEHICLE, AND CONTROL METHOD

(71) Applicant: KYOCERA Corporation, Kyoto (JP)

(72) Inventor: Takeshi Makabe, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 367 days.

(21) Appl. No.: 17/679,642

(22) Filed: Feb. 24, 2022

(65) Prior Publication Data

US 2022/0279330 A1 Sep. 1, 2022

Related U.S. Application Data

(63) Continuation of application No. PCT/JP2020/031990, filed on Aug. 25, 2020.

(30) Foreign Application Priority Data

Aug. 28, 2019 (JP) ................. 2019-156144

(51) Int. Cl.
*H04W 4/029* (2018.01)
*G08B 25/00* (2006.01)
*G08B 25/10* (2006.01)
*H04W 4/90* (2018.01)

(52) U.S. Cl.
CPC ............ *H04W 4/90* (2018.02); *G08B 25/003* (2013.01); *G08B 25/10* (2013.01); *H04W 4/029* (2018.02)

(58) Field of Classification Search
CPC ...... H04W 4/90; H04W 4/029; G08B 25/003; G08B 25/10

USPC ....................................... 455/404.1
See application file for complete search history.

(56) References Cited

U.S. PATENT DOCUMENTS

| 2015/0031324 | A1* | 1/2015 | Zentner | ............ H04W 4/14 455/404.1 |
| 2015/0358798 | A1 | 12/2015 | Okawa et al. | |
| 2020/0029194 | A1* | 1/2020 | Speaker | ............ H04W 4/027 |

FOREIGN PATENT DOCUMENTS

| JP | 2002-152359 A | 5/2002 |
| JP | 2015-194830 A | 11/2015 |
| JP | 2018-007270 A | 1/2018 |
| WO | 2014/112149 A1 | 7/2014 |

* cited by examiner

Primary Examiner — Ted M Wang
(74) Attorney, Agent, or Firm — Studebaker & Brackett PC

(57) ABSTRACT

The wireless communication apparatus is a wireless communication apparatus mounted on a vehicle and supports a plurality of emergency report schemes. The wireless communication apparatus includes a wireless communicator configured to perform wireless communication, and a controller configured to perform an emergency report via the wireless communicator at a time of occurrence of a vehicle accident. The controller is configured to identify a region to which the wireless communication apparatus belongs at the time of occurrence of the vehicle accident. The controller is configured to select one emergency report scheme from the plurality of emergency report schemes based on the identified region. The controller is configured to perform the emergency report by using the one emergency report scheme selected.

9 Claims, 7 Drawing Sheets

| TRIGGER TYPE (WHETHER TO MANUALLY OR AUTOMATICALLY INITIATE EMERGENCY REPORT) |
|---|
| REPORT TYPE (ACTUAL EMERGENCY REPORT OR TEST EMERGENCY REPORT) |
| VEHICLE TYPE |
| VEHICLE REGISTRATION NUMBER |
| POWER FOR VEHICLE (GASOLINE, DIESEL, GAS, OR THE LIKE) |
| TIME STAMP |
| POSITION OF VEHICLE (LATITUDE AND LONGITUDE OF LOCATION OF OCCURRENCE OF ACCIDENT) |
| RELIABILITY OF POSITION |
| FORWARD DIRECTION OF VEHICLE |
| LATEST POSITION OF VEHICLE (OPTIONAL INFORMATION) |
| NUMBER OF OCCUPANTS (OPTIONAL INFORMATION) |
| OPTIONAL REGION |

FIG. 3

| EMERGENCY REPORT SCHEME | REGION |
|---|---|
| eCall | EU |
| ERA-GLONASS | RUSSIA |
| VOICE EMERGENCY CALL | OTHER |

FIG. 5

WIRELESS COMMUNICATION APPARATUS, VEHICLE, AND CONTROL METHOD

RELATED APPLICATIONS

The present application is a continuation based on PCT Application No. PCT/JP2020/031990, filed on Aug. 25, 2020, which claims the benefit of Japanese Patent Application No. 2019-156144 filed on Aug. 28, 2019. The content of which is incorporated by reference herein in their entirety.

TECHNICAL FIELD

The present invention relates to a wireless communication apparatus, a vehicle, and a method.

BACKGROUND ART

In recent years, a scheme known as eCall has been implemented in the European Union (EU) as an emergency report scheme for a vehicle, and a scheme known as ERA-GLONASS has been implemented in Russia. In such emergency report schemes, in response to occurrence of a vehicle accident, a wireless communication apparatus installed in the vehicle performs an emergency report to an emergency report center (e.g., see Patent Document 1). Such an emergency report center may be referred to as a Public Safety Answering Point (PSAP).

In emergency reports performed by using the ERA-GLONASS scheme and the eCall scheme, the wireless communication apparatus first transmits accident related information referred to as Minimum Set of Data (MSD) to the PSAP, and after successful receipt of the MSD, an operator of the PSAP makes a voice call with the occupant of the vehicle and identifies the status of the vehicle accident based on the contents of the MSD and the contents of the voice call.

On the other hand, in regions other than the EU and Russia, for example, in regions such as the U.S.A., a scheme known as a voice emergency call such as normal 911 has been implemented as an emergency report scheme for a vehicle. In the voice emergency call, the operator of the PSAP makes a voice call with the vehicle occupant without transmission of the MSD.

CITATION LIST

Patent Literature

Patent Document 1: JP 2015-194830 A

SUMMARY OF INVENTION

A wireless communication apparatus according to a first aspect is a wireless communication apparatus mounted on a vehicle and supporting a plurality of emergency report schemes. The wireless communication apparatus includes a wireless communicator configured to perform wireless communication, and a controller configured to perform an emergency report via the wireless communicator at a time of occurrence of a vehicle accident. The controller is configured to identify a region to which the wireless communication apparatus belongs at the time of occurrence of the vehicle accident. The controller is configured to select one emergency report scheme from the plurality of emergency report schemes based on the identified region. The controller is configured to perform the emergency report by using the one emergency report scheme selected.

A vehicle according to a second aspect includes the wireless communication apparatus according to the first aspect.

A control method according to a third aspect is a control method for controlling a wireless communication apparatus mounted on a vehicle and supporting a plurality of emergency report schemes. The control method includes identifying a region to which the wireless communication apparatus belongs at a time of occurrence of a vehicle accident, selecting one emergency report scheme from the plurality of emergency report schemes based on the identified region, and performing an emergency report by using the one emergency report scheme selected.

BRIEF DESCRIPTION OF DRAWINGS

FIG. 3 is a diagram illustrating an example of an MSD according to an embodiment.

FIG. 5 is a diagram illustrating a region identification operation according to an embodiment.

DESCRIPTION OF EMBODIMENTS

As described above, an emergency report for a vehicle varies depending on a region. Typically, a wireless communication apparatus mounted on a vehicle performs an emergency report in accordance with a preset emergency report scheme, and may thus perform an emergency report in accordance with an emergency report scheme not corresponding to the PSAP in the region where the vehicle is located at the time of occurrence of an accident.

Specifically, the MSD of the ERA-GLONASS scheme and the MSD of the eCall scheme differ in a data format, a transmission method, and the like. Thus, for example, when the wireless communication apparatus transmits the MSD of the ERA-GLONASS scheme to the PSAP in a region supporting to the eCall scheme, the PSAP fails to successfully analyze the MSD and may fail to determine the status of the accident.

Additionally, when the wireless communication apparatus uses the eCall/ERA-GLONASS scheme to perform an emergency report to the PSAP not supporting reception of the MSD of the eCall/ERA-GLONASS scheme, a sequence of MSD transmission is first activated despite the inability to perform MSD transmission, preventing transitioning to a voice call until timeout. Accordingly, the operator of the PSAP may not immediately make a voice call with a vehicle occupant and may fail to quickly rescue the occupant.

Thus, an object of the present disclosure is to enable an emergency report to the PSAP to be reliably and quickly performed.

A mobile communication system according to an embodiment will be described with reference to the drawings. In the description of the drawings, the same or similar parts are denoted by the same or similar reference signs.

Configuration of Mobile Communication System

Figure 1:
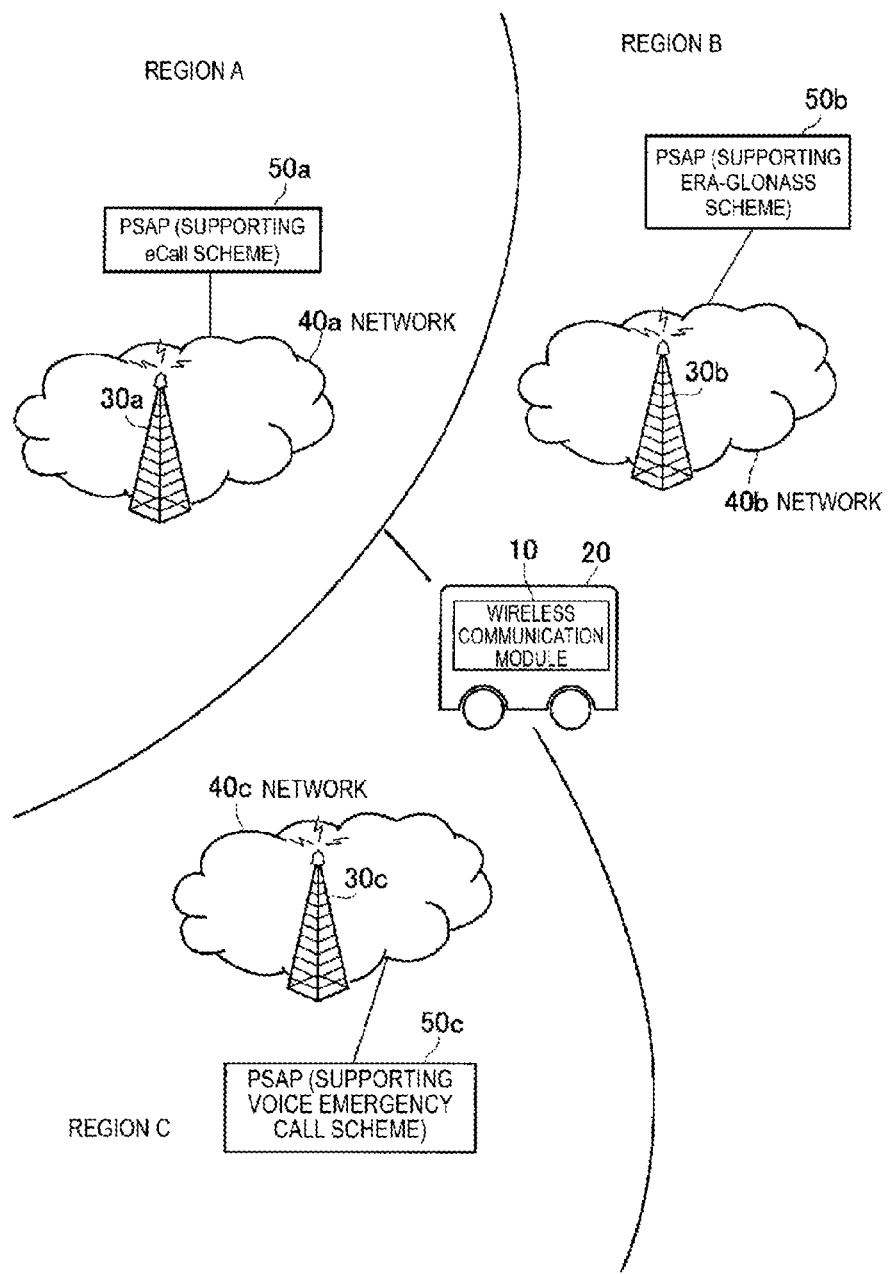
FIG. 1 is a diagram illustrating a configuration of a mobile communication system according to an embodiment.

FIG. 1 is a diagram illustrating a configuration of the mobile communication system according to an embodiment.

As illustrated in FIG. 1, the mobile communication system includes a vehicle 20 on which a wireless communication module 10 is mounted, networks 40a to 40c that provide a mobile communication service, and PSAPs 50a to 50c that provide an emergency report service. The wireless communication module 10 is an example of a wireless communication apparatus. In the following, the networks 40a to 40c are simply be referred to as the "network 40" when the networks 40a to 40c are not particularly distinguished from one another, and the PSAPs 50a to 50c are simply be referred to as the "PSAP 50" when the PSAPs 50a to 50c are not particularly distinguished from one another.

The network 40 may be referred to as a Public Land Mobile Network (PLMN). The network 40 includes a base station 30. The base station 30 may support any mobile communication scheme, and support, for example, a second generation mobile communication system such as the Global System for Mobile communications (GSM, trade name), a third generation mobile communication system such as Code Division Multiple Access (CDMA), or a fourth generation mobile communication system such as Long Term Evolution (LTE), or a fifth generation mobile communication system such as New Radio (NR).

The base station 30 periodically broadcasts PLMN information indicating the network 40 to which the base station 30 belongs. A plurality of the networks 40 may share the same base station 30, and in this case, the base station 30 belongs to the plurality of networks 40, and broadcasts a plurality of pieces of PLMN information. Note that each base station 30 manages one or a plurality of cells.

The wireless communication module 10 is a small communication terminal mounted on the vehicle 20. The wireless communication module 10 may support any communication scheme, and, for example, supports the second generation mobile communication system such as the GSM, the third generation mobile communication system such as CDMA, the fourth generation mobile communication system such as LTE, or the fifth generation mobile communication system such as NR.

The wireless communication module 10 constitutes an In Vehicle System (IVS) mounted on the vehicle 20. In one embodiment, the wireless communication module 10 mounted on the vehicle 20 will be described, but the wireless communication module 10 may be mounted on any mobile body that may be a target receiving an emergency report service. The mobile body may be any mobile body such as a ship, a train, or a mobile terminal (wireless terminal) such as a mobile phone or a smartphone. The vehicle 20 may be an automobile such as a motorcycle, a motor tricycle, or a motor four-wheel vehicle. The wireless communication module 10 may be driven by power supplied from a battery of the vehicle 20.

In FIG. 1, the vehicle 20 may travel over a plurality of regions (regions A to C). Each region includes the network 40 providing a mobile communication service in that region and the PSAP 50 providing an emergency report service in that region. For example, the region A includes the network 40a (base station 30a) providing a mobile communication service in the region A and the PSAP 50a providing an emergency report service in the region A. Here, the "region" refers to a state, a country, or an administrative region. The administrative region refers to a federation of a plurality of countries (e.g., EU), etc. For example, the region A is the EU, the region B is Russia, and the region C is Asia.

The emergency report scheme to which the PSAP 50 supports varies from region to region. For example, the PSAP 50a in the region A supports the eCall scheme, the PSAP 50b in the region B supports the ERA-GLONASS scheme, and the PSAP 50c in the region C is adapted to the voice emergency call scheme.

The wireless communication module 10 connects to the base station 30 near the current location of the wireless communication module 10 through base station search, and performs an emergency report via the network 40 to which the base station 30 corresponding to the connection destination belongs. Each network 40 basically routes an emergency report from the base station 30 of the network 40 to the PSAP 50 in the region to which the network 40 belongs. In accordance with local rules and regulations in a region, the network 40 may route the emergency report to the PSAP 50 in a region adjacent to the region to which the network 40 belongs. For example, the network 40c in the region C may route an emergency report from the base station 30c near the boundary between the region C and the region B to the PSAP 50b in the region B.

Configuration of Wireless Communication Module and Vehicle

Figure 2:
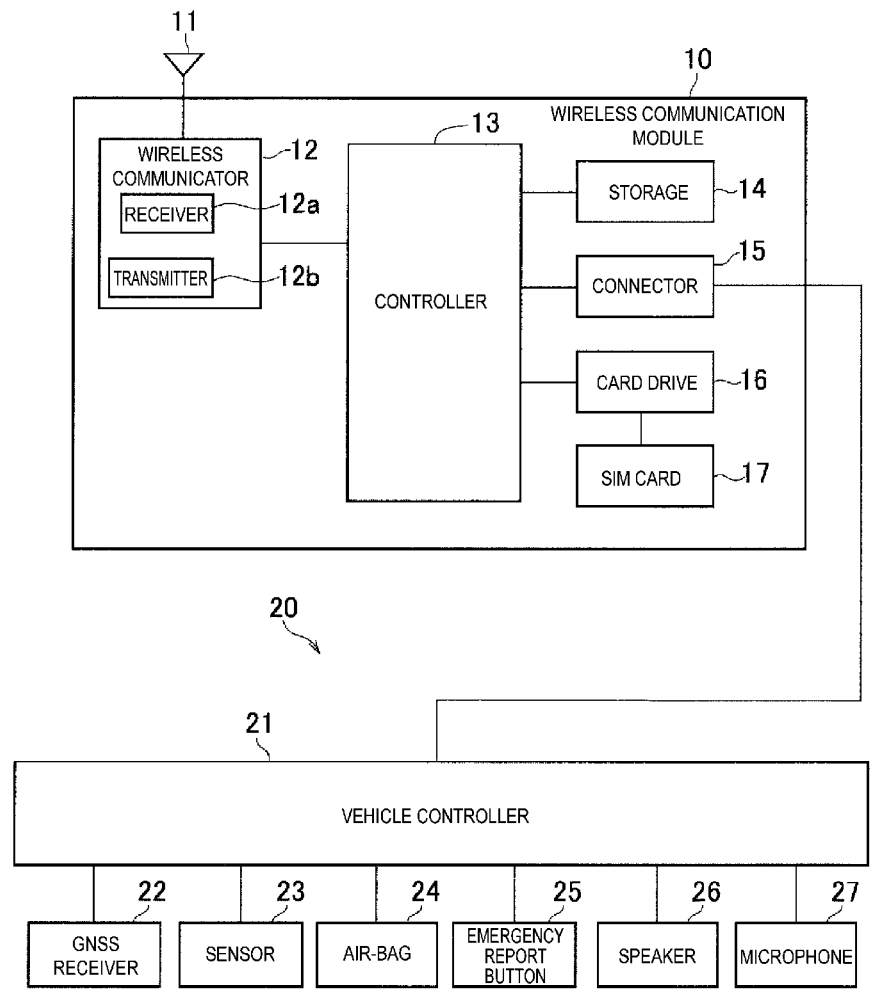
FIG. 2 is a diagram illustrating a configuration of a wireless communication module and a vehicle according to the first embodiment.

FIG. 2 is a diagram illustrating a configuration of the wireless communication module 10 and the vehicle 20 according to an embodiment. However, as the configuration of the vehicle 20, only a portion of the vehicle 20 associated with the wireless communication module 10 is illustrated.

As illustrated in FIG. 2, the wireless communication module 10 includes an antenna 11, a wireless communicator 12, a controller 13, a storage 14, a connector 15, a card drive 16, and a Subscriber Identity Module (SIM) card 17.

The antenna 11 transmits and receives radio signals to and from the base station 30.

The wireless communicator 12 is configured to perform wireless communication with the base station 30 via the antenna 11. The wireless communicator 12 includes a receiver 12a and a transmitter 12b.

The receiver 12a performs, as analog signal processing, amplification of a wireless signal received from the antenna 11, down-conversion, analog/digital conversion processing, and the like. The receiver 12a demodulates and decodes a digital signal and transfers decoded data to the controller 13.

The transmitter 12b codes data transferred from the controller 13 as digital signal processing and modulates the data to allow the data to be transmitted on a communication channel for wireless signals. The transmitter 12b performs, as analog signal processing, digital/analog conversion processing of a digital signal, up-conversion, amplification of an analog signal, and the like and transmits a wireless signal via the antenna 11.

The controller 13 mainly includes a microcomputer including a Central Processing Unit (CPU) that executes various programs, a Read Only Memory (ROM), a Random Access Memory (RAM), a backup RAM, an Input/Output (I/O), and the like. The controller 13 executes various control programs stored in the ROM to perform various processing operations. The controller 13 executes necessary processing for controlling the wireless communicator 12.

The storage 14 includes an Electronically Erasable and Programmable Read Only Memory (EEPROM) having contents that can be electrically rewritten, and stores programs and information necessary for controlling the wireless communicator 12.

The connector 15 is an interface for electrically connecting the wireless communication module 10 to the vehicle 20, and is, for example, USB IF or any other IF. The connector 15 is electrically connected to the vehicle controller 21 provided on the vehicle 20.

The card drive 16 drives an IC card referred to as a SIM card (or User Identity Module (UIM) card), that is, an information card. The card drive 16 may be able to load and unload the SIM card 17. In response to receiving information reading or writing from the controller 13, the card drive 16 reads information stored in the SIM card 17 or writes information to the SIM card 17.

The SIM card 17 may be an Embedded SIM (eSIM). The SIM card 17 may be located outside the wireless communication module 10. The SIM card 17 may be provided by a carrier or may be obtained by other means. By installing or connecting the SIM card 17 provided in or to the wireless communication module 10, a user can use the wireless communication module 10.

The vehicle 20 includes a vehicle controller 21, a Global Navigation Satellite System (GNSS) receiver 22, a sensor 23, an airbag 24, an emergency report button 25, a speaker 26, and a microphone 27.

The vehicle controller 21 mainly includes a microcomputer including a CPU that executes various programs, a ROM, a RAM, a backup RAM, an I/O, and the like. The vehicle controller 21 performs various processing operations by executing various control programs stored in the ROM. The vehicle controller 21 may be referred to as an Electronic Control Unit (ECU). The vehicle controller 21 collects various pieces of information related to the vehicle 20 and provides the information collected to the wireless communication module 10.

The GNSS receiver 22 acquires position information (latitude and longitude), and outputs the position information acquired to the vehicle controller 21. The GNSS receiver 22 may include a Global Positioning System (GPS) receiver, a Global Navigation Satellite System (GLONASS) receiver, an Indian Regional Navigational Satellite System (IRNSS) receiver, a COMPASS receiver, a Galileo receiver, and/or a QZSS Satellites System receiver. The GNSS receiver 22 may be provided in the wireless communication module 10.

The sensor 23 detects an impact or the like applied to the vehicle 20, and outputs a detection result to the vehicle controller 21. The sensor 23 includes an acceleration sensor, for example. The vehicle controller 21 determines whether to perform an emergency report, based on the detection result from the sensor 23. For example, in a case where an impact exceeding a predetermined value is detected by the sensor 23, the vehicle controller 21 determines that an emergency report is to be performed and outputs information related to the emergency report to the wireless communication module 10. In such a case, the emergency report is initiated by an automatic trigger. The sensor 23 may be provided in the wireless communication module 10.

The airbag 24 operates (deploys) under the control of the vehicle controller 21. For example, when the vehicle controller 21 determines to activate the airbag 24, based on the detection result from the sensor 23, the vehicle controller 21 performs control to activate the airbag 24. The vehicle controller 21 may output, to the wireless communication module 10, information indicating the state (active or inactive) of the airbag 24.

The emergency report button 25 receives an emergency report operation from an occupant and outputs, to the vehicle controller 21, a signal indicating that the emergency report operation has been received. When the emergency report button 25 receives the emergency report operation, the vehicle controller 21 determines that an emergency report is to be performed and outputs, to the wireless communication module 10, information related to the emergency report. In such a case, a manually triggered emergency report is initiated.

The speaker 26 converts a voice signal from the vehicle controller 21 into voice and outputs the voice. The microphone 27 converts voice into a voice signal and outputs the voice signal to the vehicle controller 21. For example, the speaker 26 and the microphone 27 are used for the occupant to make a voice call with the operator of the PSAP 50.

Examples of the emergency report scheme include the eCall scheme, the ERA-GLONASS scheme, and the voice emergency call scheme. The wireless communication module 10 supports the plurality of emergency report schemes. In other words, the wireless communication module 10 can perform an emergency report by using any one of the plurality of emergency report schemes. The wireless communication module 10 may support an emergency report scheme other than the plurality of emergency report schemes.

The emergency report using the eCall scheme and the ERA-GLONASS scheme is an emergency report scheme involving MSD transmission. In such an emergency report scheme, first, the controller 13 performs an emergency call to the PSAP 50 in response to occurrence of a vehicle accident. The controller 13 uses, for example, activation of the airbag 24 or depression of the emergency report button 25 at the time of occurrence of a vehicle accident as a trigger to make an emergency call to the PSAP 50. Second, in response to initiation of communication with the PSAP 50, the controller 13 transmits MSD to the PSAP 50. As illustrated in FIG. 3, the MSD includes the minimum information required for rescue activity, such as the vehicle type of the vehicle 20, the number of occupants, the position information of the vehicle 20, and the like. Third, after transmission of the MSD, the operator of the PSAP 50 makes a voice call with an occupant of the vehicle 20, determines the status of the vehicle accident based on the contents of the MSD and the contents of the voice call, and requests an emergency center, a fire station, and police to perform rescue according to the status of the vehicle accident.

Here, the method for transmitting the MSD may vary between the eCall scheme and the ERA-GLONASS scheme. For example, the ERA-GLONASS scheme allows the MSD to be transmitted by using a Short Message Service (SMS) scheme, whereas the eCall scheme is not allowed to transmit the MSD by using the SMS scheme. In this case, the PSAP 50a supporting the eCall scheme may ignore the MSD transmitted by SMS and may fail to determine the status of the accident.

The MSD of the eCall scheme and the MSD of the ERA-GLONASS scheme may differ in the data format (e.g., the number of bits in an MSD data packet, or the like). For example, in a case where the number of bits in the MSD data packet of the ERA-GLONASS scheme is 160, whereas the number of bits in the MSD data packet of the eCall scheme is 200, the PSAP 50 supporting the eCall scheme may decode only 160 bits of the MSD data packet transmitted by using the ERA-GLONASS scheme, while not decoding the remaining 40 bits. The PSAP 50 analyzes only a portion of the contents of the MSD received, while discarding the remaining portion.

The voice emergency call scheme is an emergency report scheme without MSD transmission. In such an emergency report scheme, first, the controller 13 performs an emergency call to the PSAP 50 in response to occurrence of a vehicle accident. The controller 13 uses, for example, activation of the airbag 24 or depression of the emergency report button 25 at the time of occurrence of a vehicle accident as a trigger to make an emergency call to the PSAP 50. Second, in response to initiation of communication, the operator of the PSAP 50*c* immediately makes a voice call with the occupant of the vehicle 20 to check the status of the vehicle accident.

In this regard, when the wireless communication module 10 performs an emergency report to the PSAP 50*c* not supporting the emergency report scheme with MSD transmission (eCall/ERA-GLONASS scheme) by using the eCall/ERA-GLONASS scheme, the sequence of MSD transmission may first be activated despite the inability to perform MSD transmission, preventing transitioning to a voice call until timeout. This may prevent the operator of the PSAP 50 from immediately making a voice call with the occupant of the vehicle.

Operation of Wireless Communication Module

Figure 4:
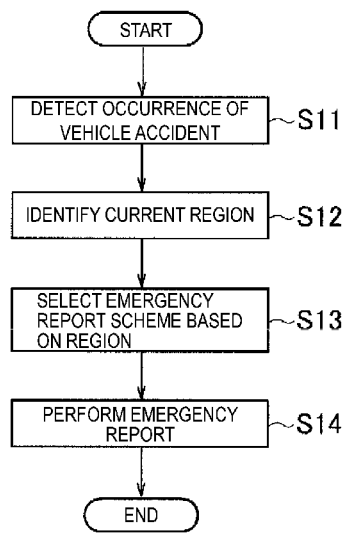
FIG. 4 is a diagram illustrating operations of a wireless communication module according to an embodiment.

FIG. 4 is a diagram illustrating operations of the wireless communication module 10 according to an embodiment.

As illustrated in FIG. 4, in step S11, the connector 15 receives information related to an emergency report from the vehicle controller 21 at the time of the occurrence of the vehicle accident. The information related to the emergency report may include the initiation of the emergency report and the type of an initiation trigger for the emergency report (automatic or manual). When the controller 13 is notified by the vehicle controller 21 that the emergency report is to be initiated, the controller 13 detects the occurrence of the vehicle accident. Alternatively, information related to the emergency report from the vehicle controller 21 may include a detection result from the sensor 23. In response to the sensor 23 detecting an impact exceeding a predetermined value, the controller 13 may detect the occurrence of a vehicle accident.

In step S12, the controller 13 identifies a region to which the wireless communication module 10 belongs. Details of the operation of identifying the region will be described below.

In step S13, the controller 13 selects one emergency report scheme from the plurality of emergency report schemes to which the wireless communication module 10 supports, based on the region identified in step S12. For example, the controller 13 acquires association information indicating a correspondence relationship between the region and the emergency report scheme corresponding to the region, and selects, based on the association information, an emergency report scheme corresponding to the region identified in step S12. The association information may be stored in the storage 14 of the wireless communication module 10 in advance.

FIG. 5 is a diagram illustrating an example of the association information. As illustrated in FIG. 5, the emergency report scheme corresponding to the EU is eCall, the emergency report scheme corresponding to Russia is ERA-GLONASS, and the emergency report scheme corresponding to the regions other than the EU and Russia is the voice emergency call. The association information is periodically updated. For example, in a case where Japan is to support eCall, the association between Japan and eCall is added to the association information.

In step S14, the controller 13 controls the wireless communicator 12 to perform an emergency report by using the emergency report scheme selected in step S13.

In this way, the wireless communication module 10 can perform an emergency report using the emergency report scheme corresponding to the region (PSAP 50 in the region) to which the wireless communication module 10 belongs at the time of occurrence of a vehicle accident, and can reliably and quickly perform the emergency report to the PSAP 50.

Region Identification Operation

In the following, the operation of identifying a region to which the wireless communication module 10 belongs at the time of occurrence of a vehicle accident, in other words, details of step S12 will be described.

The controller 13 identifies a region to which the wireless communication module 10 belongs, by using at least one of base station information acquired from the base station 30 to which the wireless communicator 12 is connected, GNSS information acquired from the GNSS receiver 22, and registration region information stored in the storage 14 or the SIM card 17.

The base station information includes information indicating the region of the network 40 to which the base station 30 corresponding to the connection destination belongs. The controller 13 identifies a region indicated by base station information acquired from the base station 30 as the region to which the wireless communication module 10 belongs. The base station information may be information broadcast by the base station 30 to which the wireless communicator 12 connects. For example, the information broadcast by the base station 30 includes PLMN information. The PLMN information includes a Mobile Network Code (MCC) corresponding to a code representing the region of the network 40 to which the base station 30 belongs. The controller 13 identifies a region indicated by the MCC included in the PLMN information acquired from the base station 30 as the region to which the wireless communication module 10 belongs. Note that the base station information may be information individually transmitted from the base station 30 to the wireless communication module 10.

The GNSS information includes position information acquired by the GNSS receiver 22. Such position information indicates the latitude and longitude used as the current position of the vehicle 20 (wireless communication module 10). The controller 13 of the wireless communication module 10 references map data and the like to identify the region corresponding to the latitude and longitude of the vehicle 20 (wireless communication module 10) as the region to which the wireless communication module 10 belongs.

The registration region information includes information indicating a region to which the network 40 corresponding to the last location registration performed by the wireless communication module 10 belongs. In response to power on or recovery to an in-service state, the wireless communication module 10 needs to determine an appropriate base station 30 as a connection destination through base station search and to perform location registration with the network 40 via the base station 30. After location registration, the wireless communication module 10 stores the base station information (such as PLMN information) related to the base station 30 at the time of location registration, in the SIM card 17 and/or the storage 14 as registration region information. The wireless communication module 10 uses the registration region information during the next base station search. This allows for quick connection to the network 40. The PLMN information stored in this manner may be referred to as Registered PLMN (RPLMN). Home PLMN (HPLMN) indicating a network for which subscriber contracts is stored in the SIM card 17. In a case where the RPLMN is not stored (e.g., the wireless communication module 10 is new), the wireless communication module 10 performs base station search by using the HPLMN as registration region information. In other words, the registration region information may include HPLMN. The controller 13 identifies a region indicated by the registration region information stored in the SIM card 17 and/or the storage 14 as the region to which the wireless communication module 10 belongs.

The controller 13 identifies a region to which the wireless communication module 10 belongs, by preferentially using the base station information among the base station information, the GNSS information, and the registration region information.

As described above, the region identified by using the base station information is the region of the network 40 to which the base station 30 corresponding to the connection destination of the wireless communication module 10 belongs. The network 40 basically routes an emergency report from the base station 30 of the network 40 to the PSAP 50 in the region to which the network 40 belongs. Accordingly, by selecting an emergency report scheme corresponding to the region identified by using the base station information, the controller 13 is likely to perform an emergency report to the PSAP 50 supporting the emergency report scheme, allowing the emergency report to the PSAP 50 to be reliably and quickly performed. In a tunnel and the like, no GNSS information can be acquired, and thus the base station information is prioritized over the GNSS information.

In response to failing to identify the region by using the base station information, the controller 13 identifies the region by preferentially using the GNSS information among the GNSS information and the registration region information. The region identified by using the GNSS information is the region corresponding to the current position (latitude and longitude) of the vehicle 20 (wireless communication module 10). The wireless communication module 10 connects to the base station 30 near the current position of the wireless communication module 10 and performs an emergency report via the network 40 to which the base station 30 belongs, and thus, by selecting an emergency report scheme corresponding to the region corresponding to the current position, the wireless communication module 10 is likely to perform an emergency report to the PSAP 50 supporting the emergency report scheme.

As described above, the registration region information indicates the region of the network 40 to which the base station 30 belongs to which the wireless communication module 10 connected during the last location registration, and thus, in a high-speed traveling, the vehicle 20 may move to a region different from the region corresponding to the base station 30 to which the wireless communication module 10 connected during the last location registration. Accordingly, the registration region information has a lower priority than the base station information and the GNSS information.

Figure 6:
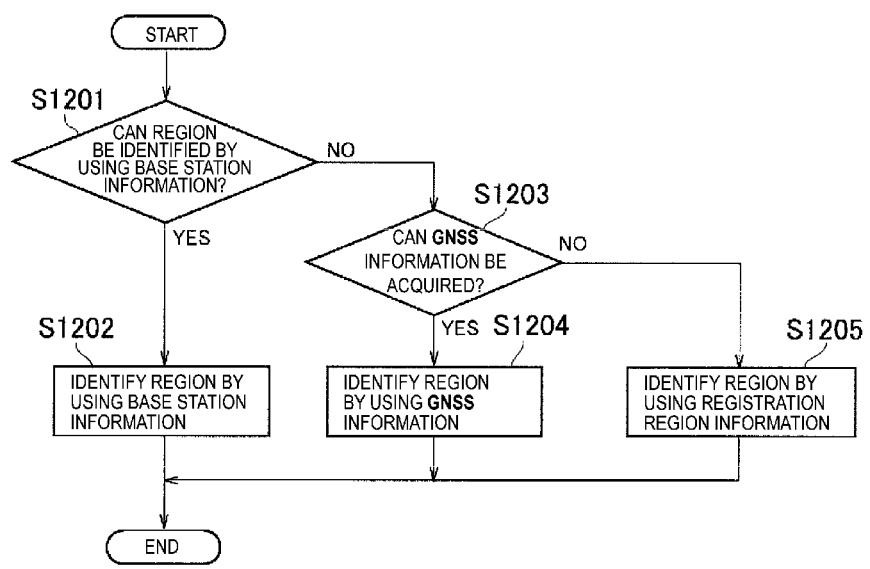
FIG. 6 is a diagram illustrating a correspondence relationship between regions and emergency report schemes according to an embodiment.

The details of step S12 in FIG. 4 will be described below using FIG. 6. FIG. 6 is a diagram illustrating a region identification operation according to an embodiment.

In step S1201, the controller 13 attempts to identify the region by using the base station information acquired from the base station 30 corresponding to the connection destination. In a case that the base station information includes information (such as PLMN information) indicating the region of the network 40 to which the base station 30 belongs, the controller 13 determines that the region can be identified by using the base station information (step S1201: YES), and identifies a region indicated by the base station information as the region to which the wireless communication module 10 belongs (step S1202).

On the other hand, in a case where the base station information includes no information indicating the region of the network 40 to which the base station 30 belongs or where the base station information includes information indicating a plurality of different regions as information indicating the region of the network 40 to which the base station 30 belongs (for example, the base station information includes a plurality of pieces of PLMN information including different MCCs), the controller 13 determines that the region fails to be identified by using the base station information (step S1201: NO), and advances the processing to step S1203.

In step S1203, the controller 13 attempts to acquire GNSS information from the GNSS receiver 22. In a case where the vehicle 20 is at a location capable of receiving radio waves from a satellite system, the GNSS receiver 22 can acquire the GNSS information, and thus the controller 13 can acquire the GNSS information from the GNSS receiver 22. On the other hand, in a case where the vehicle 20 is in a tunnel or the like, no radio waves from the satellite system are received in this location, preventing the GNSS information from being acquired from the GNSS receiver 22. In a case that the GNSS information can be acquired from the GNSS receiver 22 (step S1203: YES), the controller 13 identifies a region indicated by the GNSS information as the region to which the wireless communication module 10 belongs (step S1204). On the other hand, in response to determining that no GNSS information can be acquired from the GNSS receiver 22 (step S1203: NO), the controller 13 advances the processing to step S1205.

In step S1205, the controller 13 identifies a region indicated by the registration region information stored in the SIM card 17 and/or the storage 14 as the region to which the wireless communication module 10 belongs.

Modifications

In the above-described operations of the wireless communication module 10 (operations in FIGS. 4 and 6) according to an embodiment, the emergency report scheme is selected based on the region to which the wireless communication module 10 belongs at the time of occurrence of a vehicle accident. However, such a selection may be performed taking the degree of the vehicle accident into consideration.

In a case where the vehicle accident is serious, the wireless communication module 10 according to the present modified example identifies a region for each of two or more types of information among the base station information, the GNSS information, and the registration region information, and identifies an emergency report scheme corresponding to the identified region. In a case where two or more emergency report schemes respectively identified for the two or more types of information include an emergency report scheme with transmission of accident-related information (MSD) (hereinafter referred to as an "emergency report scheme with MSD transmission"), the wireless communication module 10 selects the emergency report scheme with MSD transmission and performs an emergency report by using the emergency report scheme with MSD transmission.

In a case where the vehicle accident is serious, the occupant of the vehicle 20 may be in an unconscious state and may be prevented from making a voice call with the operator of PSAP 50. In this case, the occupant can advantageously be rescued by using the emergency report scheme with MSD transmission to perform an emergency report.

For example, a case is assumed in which a serious accident of the vehicle 20 occurs in the vicinity of a boundary between the region B (region supporting ERA-GLONASS) and the region C (region supporting the voice emergency call scheme) as illustrated in FIG. 1 and in which the wireless communication module 10 is connected to the base station 30c in region C but in which the GNSS information (longitude and latitude) acquired by the GNSS receiver 22 corresponds to the region B.

In such a case, the controller 13 identifies the voice emergency call scheme (emergency report scheme without MSD transmission) based on base station information from the base station 30c, and identifies the ERA-GLONASS scheme based on the GNSS information. In this case, the wireless communication module 10 selects the ERA-GLONASS scheme to perform an emergency report. As described above, the network 40c in region C may route, to the PSAP 50b, the emergency report transmitted by the wireless communication module 10 by using the ERA-GLONASS scheme, thus allowing the operator of the PSAP 50b to receive the MSD to rescue the occupant of the vehicle 20.

Figure 7:
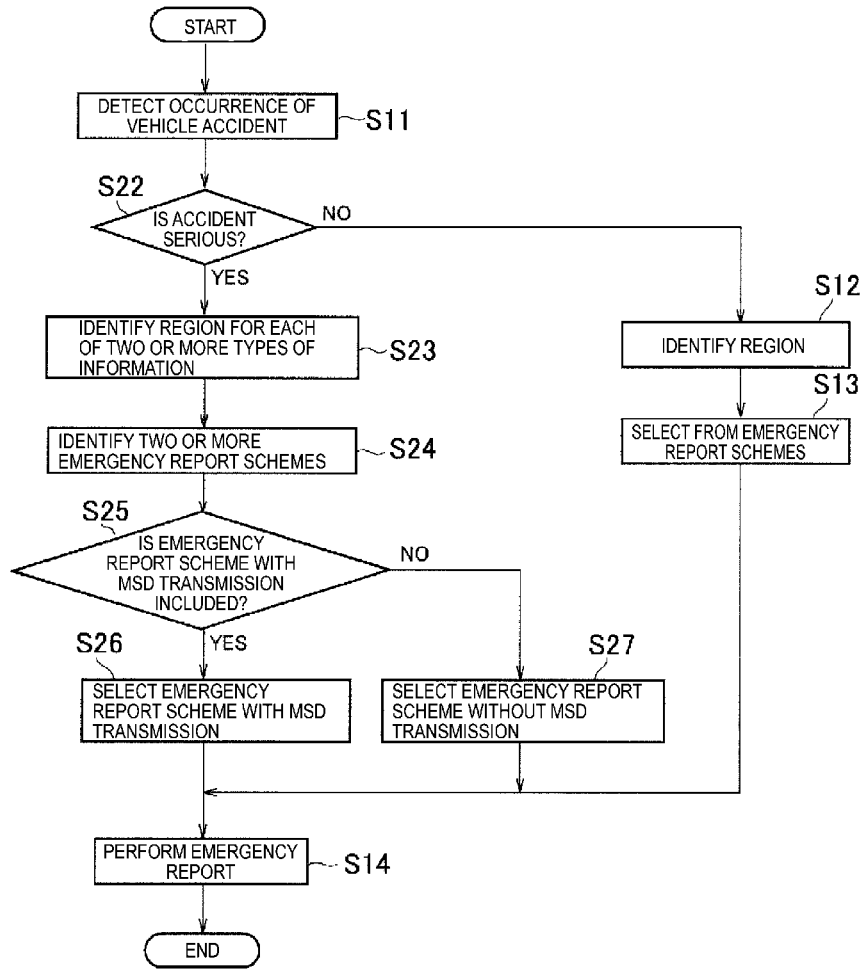
FIG. 7 is a diagram illustrating operations of a wireless communication module according to a modified example of an embodiment.

Operations of the wireless communication module 10 according to a modified example will be described below using FIG. 7.

The processing in step S11 is similar to the processing in step S11 of FIG. 4.

In step S22, the controller 13 determines whether the vehicle accident is serious based on the information related to the emergency report. Specifically, in a case where the information related to the emergency report indicates that the type of the initiation trigger for the emergency report is automatic, the controller 13 may determine that the vehicle accident is serious. As described above, in a case where the sensor 23 detects an impact exceeding a predetermined value, the vehicle controller 21 determines that an emergency report is to be performed and outputs, to the wireless communication module 10, information related to the emergency report. In such a case, the emergency report is initiated by the automatic trigger.

The controller 13 may determine that the vehicle accident is serious in a case where the airbag 24 is activated at the time of occurrence of the vehicle accident (in response to reception of the information related to the emergency report).

In response to determining that the vehicle accident is serious (step S22: YES), the controller 13 advances the processing to step S23. On the other hand, in response to determining that the vehicle accident is not serious (step S22: NO), the controller 13 advances the processing to step S12. In steps S13 and S14, processing similar to corresponding processing in FIG. 4 is executed.

In step S23, the controller 13 identifies a region for each of two or more types of information among the base station information, the GNSS information, and the registration region information. For example, the controller 13 identifies the region C based on the base station information and identifies the region B based on the GNSS information.

In step S24, the controller 13 identifies emergency report schemes corresponding to the identified regions. For example, the controller 13 references the association information described above (FIG. 5) to identify the voice emergency call scheme corresponding to the region C and the ERA-GLONASS scheme corresponding to region B.

In step S25, the controller 13 determines whether the emergency report scheme identified in step S24 includes an emergency report scheme with MSD transmission. For example, in response to identifying the voice emergency call scheme and the ERA-GLONASS scheme in step S24, the controller 13 determines YES in step S25 and selects the ERA GLONASS scheme in step S26 because the ERA-GLONASS scheme is an emergency report scheme with MSD transmission. In step S24, when the identified emergency report scheme includes two or more emergency report schemes with MSD transmission, the controller 13 selects an emergency report scheme corresponding to base station information with the highest priority (emergency report scheme with MSD transmission).

On the other hand, in a case where the emergency report scheme identified in step S24 includes no emergency report scheme with MSD transmission (step S25: NO), in step S27, the controller 13 selects the emergency report scheme identified in step S24 (emergency report scheme without MSD transmission). In step S27, when the identified emergency report scheme includes two or more emergency report schemes without MSD transmission, the controller 13 selects an emergency report scheme corresponding to information with the highest priority among the base station information, the GNSS information, and the registration region information (emergency report scheme without MSD transmission).

Other Embodiments

In the embodiments described above, the operations of the wireless communication module 10 in the case where the vehicle accident is serious have been described. However, the steps of steps S23 to S27 may be performed even in a case where the vehicle accident is not serious.

The information related to the emergency report received from the vehicle controller 21 by the connector 15 in step S11 may include information of the emergency report scheme specified by the vehicle 20 (specifically, the vehicle controller 21). In this case, in a case where the emergency report scheme specified by the vehicle 20 does not match the one emergency report scheme selected in step S13, step S26 or step S27, the controller 13 performs the emergency report using the one emergency report scheme. Accordingly, in a case where the emergency report scheme specified by the vehicle 20 is improper, the wireless communication module 10 side can change the emergency report scheme to the proper one.

The wireless communication module 10 identifies, in step S23, a region for each of two or more types of information among the base station information, the GNSS information, and the registration region information, and identifies, in step S24, an emergency report scheme corresponding to the region identified in step S23. Alternatively, the following may be repeated: when a first region is identified, an emergency report scheme corresponding to the region is identified, and when a second region is identified, an emergency report scheme corresponding to the region is identified.

A program may be provided that causes a computer to execute each processing performed by the wireless communication module 10. The program may be recorded in a computer readable medium. Use of a computer readable medium enables the program to be installed on a computer. Here, the computer readable medium on which the program is stored may be a non-transitory recording medium. The non-transitory recording medium is not particularly limited, and may be, for example, a recording medium such as a CD-ROM, a DVD-ROM, or the like. By integrating functional sections (circuits) for performing processing performed by the wireless communication module 10, part or all of the wireless communication module 10 may be configured as a semiconductor integrated circuit (chip set, SoC).

Embodiments have been described above in detail with reference to the drawings, but specific configurations are not limited to those described above, and various design modifications can be made without departing from the gist of the present disclosure.

The invention claimed is:

1. A wireless communication apparatus mounted on a vehicle and supporting a plurality of emergency report schemes which varies depending on a region, the wireless communication apparatus comprising:
   a wireless communicator configured to perform wireless communication; and
   a controller configured to perform an emergency report to an emergency report center in a region via the wireless communicator at a time of occurrence of a vehicle accident, wherein
   the plurality of emergency report schemes include a Minimum Set of Data (MSD) transmission and a voice emergency call, and
   the controller is configured to
   identify the region to which the wireless communication apparatus belongs at the time of occurrence of the vehicle accident,
   select one emergency report scheme corresponding to the emergency report center in the region from the plurality of emergency report schemes based on the identified region, and
   perform the emergency report by using the one emergency report scheme selected.

2. The wireless communication apparatus according to claim 1, wherein
   the controller is configured to identify the region by using at least one of base station information acquired from a base station to which the wireless communication apparatus is connected, GNSS information acquired from a GNSS receiver provided in the vehicle or the wireless communication apparatus, or registration region information stored in the wireless communication apparatus.

3. The wireless communication apparatus according to claim 2, wherein
   the controller is configured to identify the region by prioritizing use of the base station information among the base station information, the GNSS information, and the registration region information.

4. The wireless communication apparatus according to claim 3, wherein
   the controller is configured to identify the region by prioritizing use of the GNSS information out of the GNSS information and the registration region information in a case that the region cannot be identified by using the base station information.

5. The wireless communication apparatus according to claim 2, wherein
   the controller is configured to
   identify at least one region for two or more types of information among the base station information, the GNSS information, and the registration region information, and identify two or more emergency report schemes, out of the plurality of emergency report schemes, corresponding to the identified at least one region, and
   perform the emergency report by selecting an emergency report scheme with transmission of accident-related information in a case where the two or more emergency report schemes identified include the emergency report scheme with transmission of accident-related information.

6. The wireless communication apparatus according to claim 2, wherein
   in a case where the vehicle accident is serious, the controller is configured to
   identify at least one region for two or more types of information among the base station information, the GNSS information, and the registration region information and identify two or more emergency report schemes corresponding to the identified at least one region, and
   perform the emergency report by selecting an emergency report scheme with transmission of accident-related information in a case where the two or more emergency report schemes identified include the emergency report scheme with transmission of accident-related information.

7. A vehicle comprising the wireless communication apparatus according to claim 1.

8. A control method for controlling a wireless communication apparatus mounted on a vehicle and supporting a plurality of emergency report schemes which varies depending on a region, the control method comprising:
   identifying a region to which the wireless communication apparatus belongs at a time of occurrence of a vehicle accident;
   selecting one emergency report scheme corresponding to an emergency report center in the region from the plurality of emergency report schemes based on the identified region; and
   performing an emergency report to the emergency report center in the region by using the one emergency report scheme selected, wherein
   the plurality of emergency report schemes include a Minimum Set of Data (MSD) transmission and a voice emergency call.

9. A wireless communication apparatus mounted on a vehicle and supporting a plurality of emergency report schemes, the wireless communication apparatus comprising:
   a wireless communicator configured to perform wireless communication; and
   a controller configured to perform an emergency report via the wireless communicator at a time of occurrence of a vehicle accident, wherein
   the controller is configured to
   identify a region to which the wireless communication apparatus belongs at the time of occurrence of the vehicle accident,
   identify the region by using at least one of base station information acquired from a base station to which the wireless communication apparatus is connected, GNSS information acquired from a GNSS receiver provided in the vehicle or the wireless communication apparatus, or registration region information stored in the wireless communication apparatus,
   identify the region by prioritizing use of the base station information among the base station information, the GNSS information, and the registration region information, select one emergency report scheme from the plurality of emergency report schemes based on the identified region, and perform the emergency report by using the one emergency report scheme selected.

* * * * *